United States Patent [19]
Lubin et al.

[11] Patent Number: 5,958,196
[45] Date of Patent: *Sep. 28, 1999

[54] PLANAR CARBON FIBER AND NOBLE METAL OXIDE ELECTRODES AND METHODS OF MAKING THE SAME

[75] Inventors: Mark Lubin; Sjef Otten, both of Miami, Fla.

[73] Assignee: Upscale Water Technologies, Inc., Miami, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/787,382

[22] Filed: Jan. 22, 1997

Related U.S. Application Data

[63] Continuation-in-part of application No. 08/758,584, Nov. 27, 1996, which is a continuation-in-part of application No. 08/671,264, Jun. 26, 1996, Pat. No. 5,614,078, which is a continuation-in-part of application No. 08/457,040, Jun. 1, 1995, abandoned.

[51] Int. Cl.[6] ................................................ C02F 1/461
[52] U.S. Cl. ........................ 204/242; 204/275; 204/286; 204/294
[58] Field of Search .................................. 204/242, 275, 204/294, 286

[56] References Cited

U.S. PATENT DOCUMENTS

| | | | |
|---|---|---|---|
| 3,446,607 | 5/1969 | Volk et al. | 29/195 |
| 3,542,657 | 11/1970 | Mindler et al. | 204/98 |
| 3,632,498 | 1/1972 | Beer | 204/290 F |
| 3,891,535 | 6/1975 | Wikey | 204/275 |
| 3,953,313 | 4/1976 | Levenson | 204/294 |
| 4,046,663 | 9/1977 | Fleet et al. | 204/280 |

(List continued on next page.)

OTHER PUBLICATIONS

G. Lodi et al., Microstructure and electrical properties of $IrO_2$ prepared by thermal decomposition of $IrCl_3 \cdot H_2O$: Role Played by the conditions of thermal treatment, J. Electroanal. Chem., vol. 277, pp. 139–150 (1990) No Month.

Y. Sato et al., Electrochromism in thermally oxidized iridium oxide films in $LiClO_4$/propylene carbonate, Note(1989) No Month.

V.M. Jovanovic et al., The roles of the ruthenium concentration profile, the stabilizing component and the substrate on the stability of oxide coating, J. Electroanal. Chem, vol. 339, pp. 147–165 (1992) No Month.

(List continued on next page.)

*Primary Examiner*—Arun S. Phasge
*Attorney, Agent, or Firm*—Jones & Askew, LLP

[57] ABSTRACT

Planar electrodes include a carbon fiber cloth which is woven or braided from a plurality of PAN-derived carbon fibers and which is mounted in a frame. The frame is preferably made of an inert plastic material such as TEFLON, PVC, or DELRIN and the carbon fiber cloth is preferably affixed to the frame with metal strips and fasteners. The metal strips are preferably titanium or a noble metal and the fasteners are preferably made of the same metal as the strips. The metal strips form a low impedance electrical contact with the carbon fiber cloth and enable the electrode to be coupled to a wire lead or electrical contact for use in an electrochemical circuit. According to a second embodiment, the carbon fiber cloth is sandwiched between two metal frames. According to a third embodiment, the carbon fiber cloth is sandwiched between two plastic frames with conductive foil strips or titanium strips forming an electrical contact with the carbon fiber cloth. The carbon fiber cloth may be coated with a noble metal oxide either before or after attachment to the frame. The electrodes according to the invention are ideally suited for use in a nitrate removal system as cathodes and anodes. When used as anodes, several layers of carbon fiber cloth are mounted in a frame. A nitrate removal system incorporating electrodes according to the invention is also disclosed.

18 Claims, 4 Drawing Sheets

5,958,196
Page 2

U.S. PATENT DOCUMENTS

| | | | |
|---|---|---|---|
| 4,056,482 | 11/1977 | Schmieder et al. | 252/301.1 |
| 4,212,724 | 7/1980 | Moeglich | 204/273 |
| 4,257,352 | 3/1981 | Habegger | 119/5 |
| 4,308,122 | 12/1981 | DasGupta et al. | 204/294 |
| 4,360,417 | 11/1982 | Reger et al. | 204/294 |
| 4,397,719 | 8/1983 | Yoshida | 204/91 |
| 4,451,498 | 5/1984 | Hashimoto et al. | 427/38 |
| 4,828,666 | 5/1989 | Iizuka et al. | 204/294 |
| 4,956,057 | 9/1990 | Stucki et al. | 204/101 |
| 5,030,331 | 7/1991 | Sato | 204/38.3 |
| 5,080,963 | 1/1992 | Tatarchuk et al. | 428/225 |
| 5,094,732 | 3/1992 | Oldani et al. | 204/182.4 |
| 5,096,663 | 3/1992 | Tatarchuk | 419/11 |
| 5,098,546 | 3/1992 | Kawashima et al. | 204/290 R |
| 5,148,772 | 9/1992 | Kirschbaum | 119/5 |
| 5,156,726 | 10/1992 | Nakada et al. | 204/290 F |
| 5,171,644 | 12/1992 | Tsou et al. | 429/12 |
| 5,256,451 | 10/1993 | Philipp et al. | 427/374.2 |
| 5,304,330 | 4/1994 | Tatarchuk et al. | 264/61 |
| 5,306,400 | 4/1994 | Bradbury | 204/101 |
| 5,314,760 | 5/1994 | Tsou et al. | 429/12 |
| 5,376,240 | 12/1994 | Kaczur et al. | 204/128 |
| 5,393,386 | 2/1995 | Aoyama et al. | 204/78 |
| 5,399,541 | 3/1995 | Ishii et al. | 502/326 |
| 5,460,705 | 10/1995 | Murphy et al. | 204/252 |
| 5,474,965 | 12/1995 | Nakatsuji et al. | 502/330 |
| 5,495,979 | 3/1996 | Sastri et al. | 228/124.1 |

OTHER PUBLICATIONS

Y. Sato et al., Electrochromism in iridium oxide films prepared by thermal oxidation of iridium–carbon composite films, J. Electrochem. Soc., vol. 134, No. 3, pp. 570–575 (Mar. 1987).

Y. Kamegaya et al., Improved durability of iridium oxide coated titanium anode with interlayers for oxygen evolution at high current densities, Electrochemica Acta, vol. 40, No. 7, pp. 889–895 (1995) No Month.

Y. Sato et al., Electrochromism in thermally oxidized iridium oxide films in $LiClO_4$/propylene carbonate, Note(1989) No Month.

M. Vukovic, Oxygen evolution reaction on thermally treated iridium oxide films, J. Appl. Electrochem., vol. 17, pp. 737–745 (1987) No Month.

K.Kinoshita, Carbon, Electrochemical and Physicochemical Properties, J. Wiley & Sons, 1988 No Month.

Ma Ling, Electrocatalytic Reduction of Nitrate by Foreign Pb Adatoms, Electrochimica Acta, vol. 38, No. 18, pp. 2773–2775, (1993) No Month.

M. Bever. Encyclopedia of Materials Science and Engineering, vol. 1, A–Co., Pergamon Press (1986) No Month.

H. March, Introduction to Carbon Science, Butterworths, Kent, England. (No Date).

C. Lynch, CRC Handbook of Materials Science, vol. III, NonMetallic Materials and Applications. (No Date).

M. Bever. Encyclopedia of Materials Science and Engineering, vol. 1, A–Co., Pergamon Press (1986) No Month.

J O'M. Bockris, Modern Electrochemistry, vol. 2 (1973) No Month.

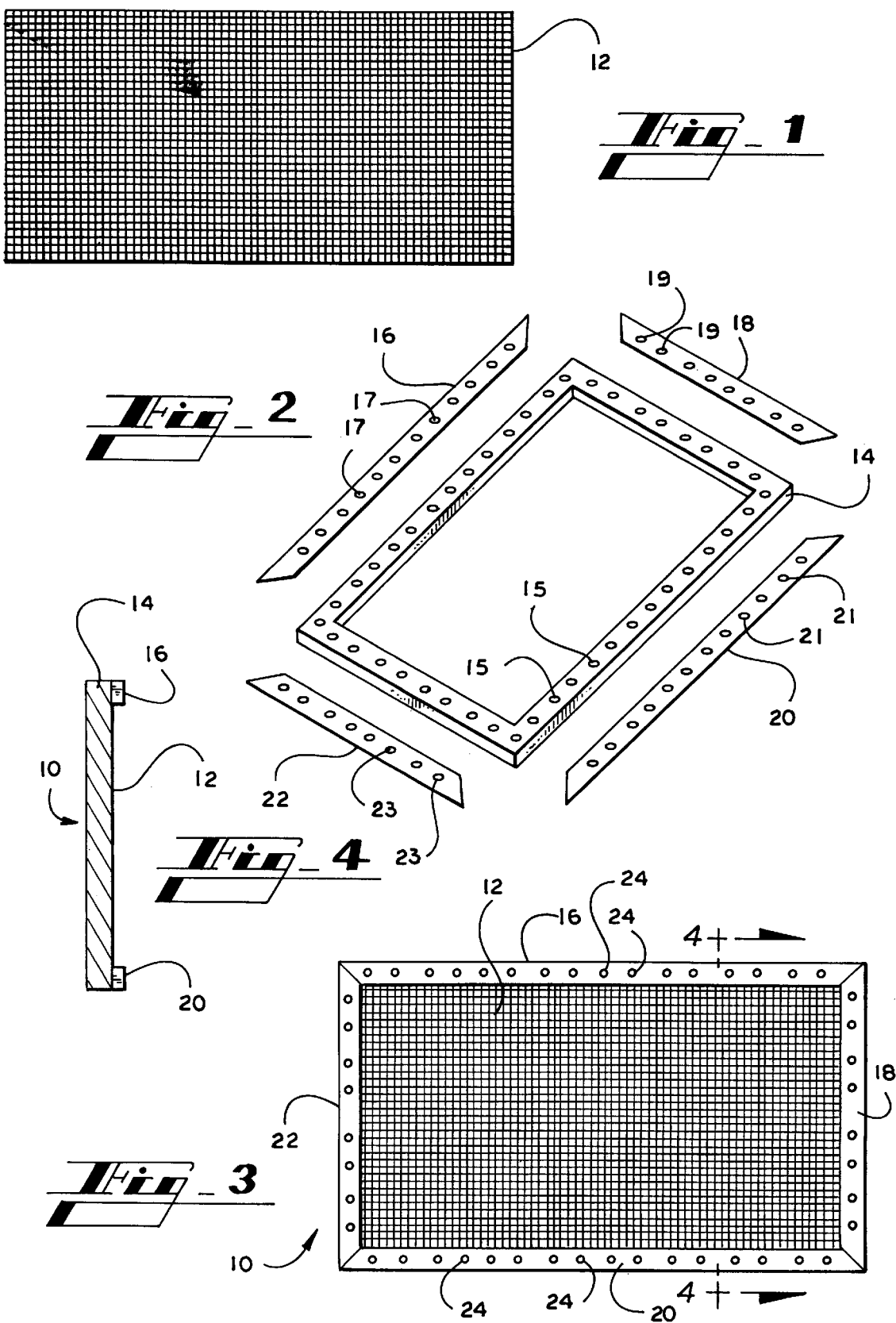

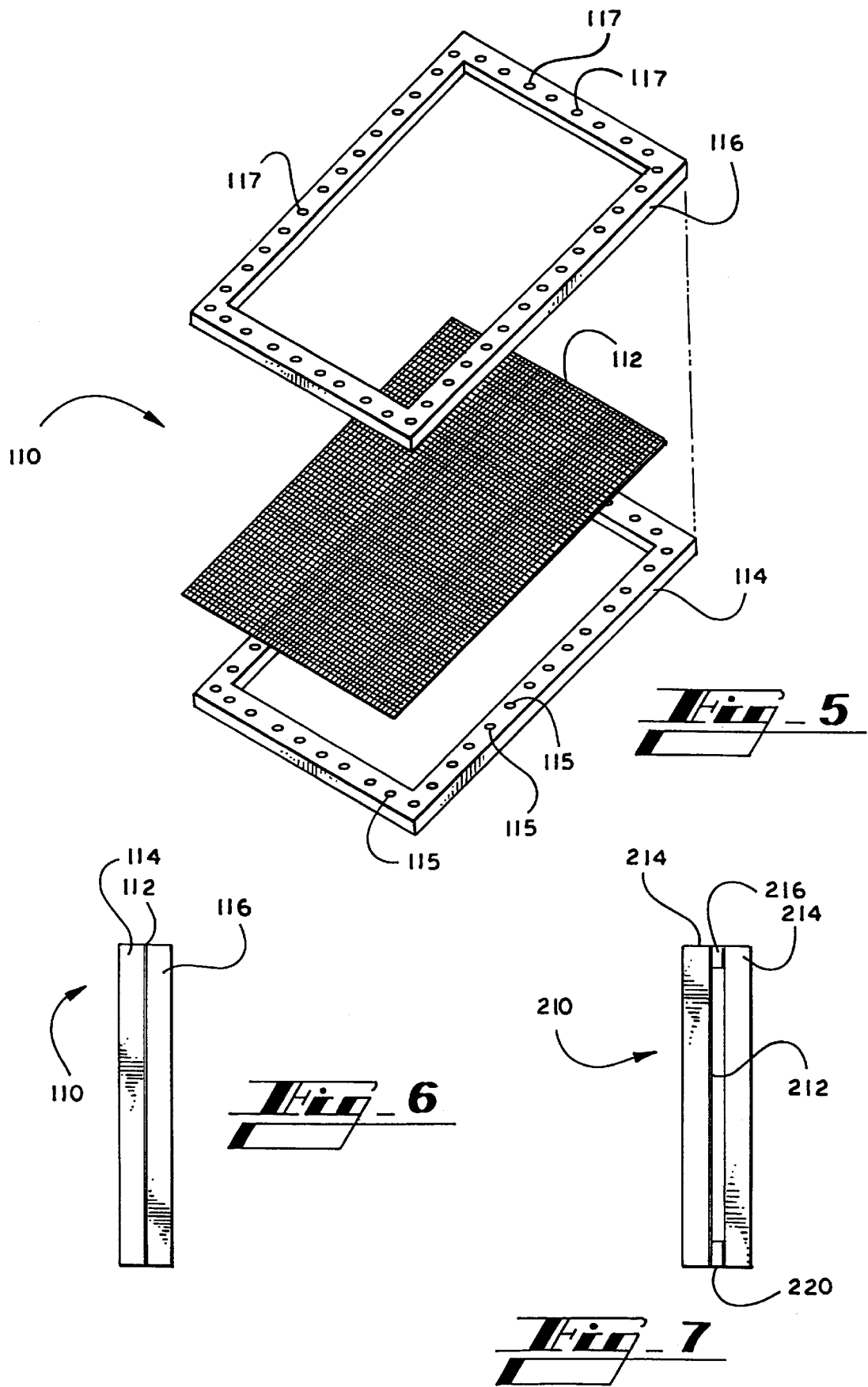

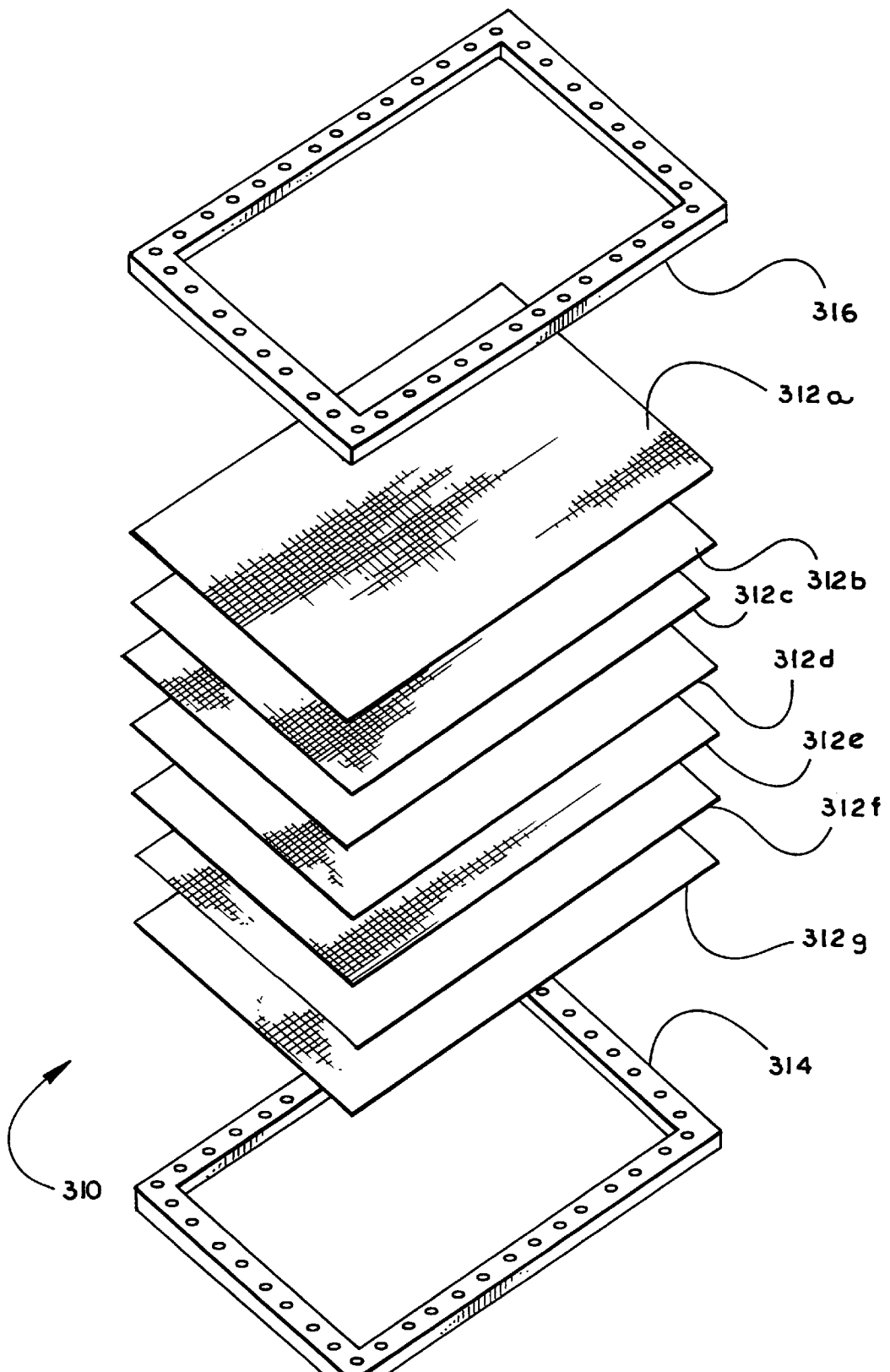

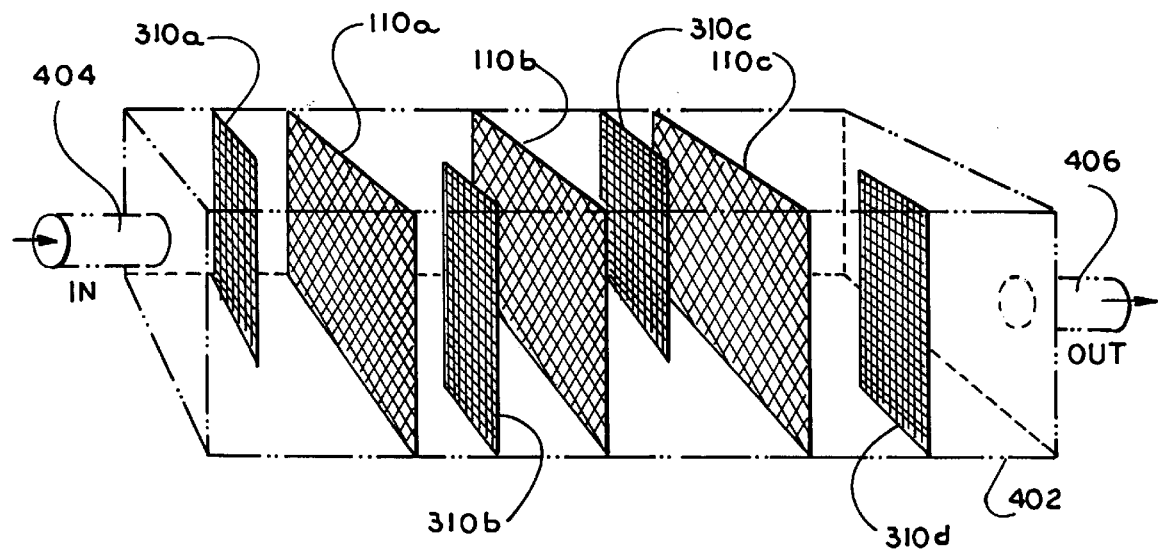
Fig_9
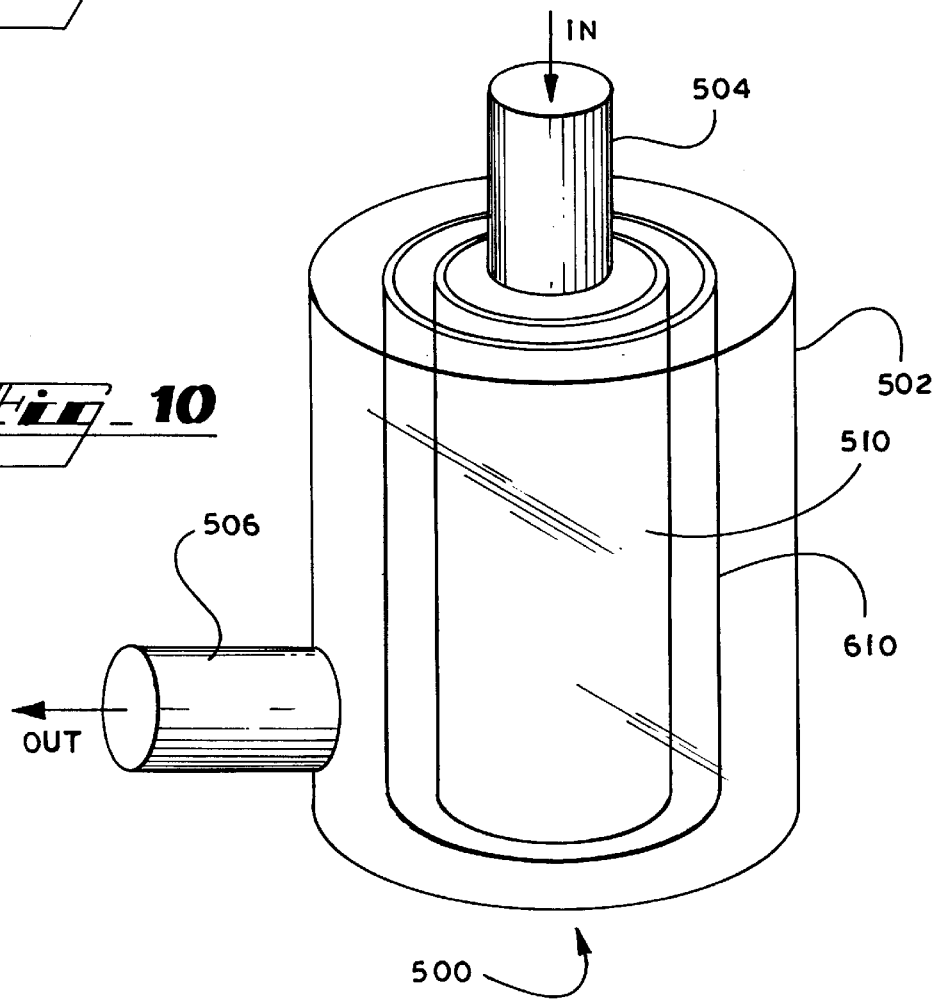
Fig_10

PLANAR CARBON FIBER AND NOBLE METAL OXIDE ELECTRODES AND METHODS OF MAKING THE SAME

This application is a continuation-in-part of application Ser. No. 08/758,584 filed Nov. 27, 1996, which in turn is a continuation-in-part of allowed application Ser. No. 08/671,264 filed Jun. 26, 1996 now U.S. Pat. No. 5,614,078 which in turn is a continuation-in-part of Ser. No. 08/457,040 filed Jun. 1, 1995, now abandoned, the complete disclosures of which are hereby incorporated herein by reference.

BACKGROUND OF THE INVENTION

1. Field of the Invention

The invention relates to electrochemical reactions and electrodes used therein. More particularly, the invention relates to electrodes for use in the electrochemical removal of nitrates from water and methods for making such electrodes.

2. State of the Art

Parent applications Ser. No. 08/671,264 and Ser. No. 08/457,040 disclose methods and apparatus for the removal of nitrates from water. Although not limited thereto, the apparatus generally includes an electrochemical flow cell through which the aqueous solution containing nitrates flows or a holding tank cell into which the solution is introduced and then released after processing, and an electrode system including a carbon fiber cathodic electrode, a carbon fiber anodic electrode and a reference electrode. All of the electrodes are immersed in the aqueous solution and coupled to an electronic control circuit which impresses a voltage across the electrodes such that the voltage causes electrochemical reduction/oxidation reactions on the surfaces of the cathodic and anodic electrodes. According to the method, the electrodes are at a potential wherein nitrates are reduced to gaseous products but hydrogen, oxygen, chlorine, and other noxious substances are not produced. According to the disclosed preferred embodiment, the reference electrode is a silver/silver-chloride electrode, the cathodic and anodic electrodes are carbon fibers based on polyacrylonitrile (PAN), and the surface area ratio of the anodic electrode to the cathodic electrode is preferably in the range of 40:1 to 120:1.

As disclosed in these parent applications, the anodic to cathodic surface area ratio must be large in order to prevent a chlorine evolution reaction from taking place in salt water and to prevent oxygen evolution reactions and changes in pH in fresh water. In practice, it has been discovered that, in seawater, an anodic to cathodic surface area ratio of up to 150:1 is desirable to prevent chlorine formation under any circumstances. In addition, the anodic voltage (relative to the reference electrode) must be kept below +800 mV to prevent chlorine formation in seawater. Moreover, in flow-through systems, an increased flow rate (flow velocity relative to the cathode) increases the nitrate reduction current and, as a consequence, causes an increase in the anodic voltage.

Parent application Ser. No. 08/758,584 discloses a carbon fiber electrode which is coated with a noble metal oxide to create a noble metal oxide electrode with a very large surface area. According to a disclosed preferred embodiment, the noble metal oxide is iridium oxide. A disclosed method of making the electrode includes preparing a solution of iridium chloride and isopropyl alcohol, dipping a carbon fiber electrode into the solution, drying the electrode in the presence of nitrogen and heat, and heat treating the electrode in the presence of oxygen. A disclosed apparatus for removing nitrates from water includes an electrochemical flow cell through which the aqueous solution containing nitrates flows or a holding tank cell into which the solution is introduced and then released after processing, and an electrode system including an anodic iridium oxide coated carbon fiber electrode as described above, a carbon fiber cathodic electrode and a reference electrode. All of the electrodes are immersed in the aqueous solution and coupled to an electronic control circuit which impresses a voltage across the electrodes such that the voltage causes electrochemical reduction/oxidation reactions on the surface of the cathodic electrode. The electrodes are at a potential wherein nitrates are reduced but hydrogen, oxygen, and chlorine are not produced.

All of the carbon fiber and noble metal oxide electrodes disclosed in the parent applications have a relatively high surface area to volume ratio. This property has the advantage of allowing the provision of a relatively compact system while maintaining the required anodic to cathodic surface area ratios. It has been discovered that the efficiency at which the cathodic electrodes operate is also related to how much of the water being processed actually comes in contact with the cathodic electrode surface. It is therefore desirable to configure and place cathodic electrodes in order to maximize the amount of water which actually impinges on the cathodic electrode surface. This is particularly important in large volume systems where a relatively large volume of water needs to be processed in a relatively short period of time.

SUMMARY OF THE INVENTION

It is therefore an object of the invention to provide an electrode for use in large electrochemical processes which maximizes contact with the solution to be processed.

It is also an object of the invention to provide an electrode for use in an electrochemical process which has an efficient volume to surface area ratio.

It is another object of the invention to provide an electrode which is particularly well suited for use in large volume electrochemical nitrate removal systems.

It is still another object of the invention to provide an electrode which is easy to make and easy to install.

It is also an object of the invention to provide methods of making an electrode which has an efficient volume to surface area ratio.

It is yet another object of the invention to provide a nitrate removal system which incorporates the electrodes according to the invention.

In accord with these objects which will be discussed in detail below, the electrodes of the present invention have a planar geometry and are composed of many carbon fibers which may or may not be coated with a noble metal oxide. According to one embodiment of the invention, the electrode includes a carbon fiber cloth which is woven or braided from a plurality of PAN-derived carbon fibers and the cloth is mounted in a frame. The frame is preferably made of an inert plastic material such as TEFLON, PVC, or DELRIN and the carbon fiber cloth is preferably affixed to the frame with metal strips and fasteners. The metal strips are preferably titanium or a noble metal and the fasteners are preferably made of the same metal as the strips. The metal strips form a low impedance electrical contact with the carbon fiber cloth and enable the electrode to be coupled to a wire lead or electrical contact for use in an electrochemical circuit. According to a second embodiment of the invention, the carbon fiber cloth is sandwiched between two metal frames. According to a third embodiment of the invention, the carbon fiber cloth is sandwiched between two plastic frames with conductive foil strips forming an electrical contact with the carbon fiber cloth. The carbon fiber cloth may be coated with a noble metal oxide either before or after attachment to the frame.

The planar carbon fiber and noble metal oxide electrodes according to the invention are ideally suited for use as electrodes in a nitrate removal system according to the parent applications. When used as a cathode in a nitrate removal system, the carbon fiber cloth electrode preferably covers the entire flow path of the water being treated. When used as an anode in a nitrate removal system, the electrode is preferably made of many layers of carbon fiber cloth in order to meet the surface area ratio requirements of the system. Consequently, the anodes are preferably arranged so that open spaces in the flow path are provided in order to facilitate the flow of water through the system. The carbon cloth may be woven or braided in many ways including plain, satin, crowfoot satin, twill, and basket weave. Thread counts of 6 to 12.5 tows per inch and yarn densities of 1 k to 18 k fibers per tow are presently preferred. Additional objects and advantages of the invention will become apparent to those skilled in the art upon reference to the detailed description taken in conjunction with the provided figures.

BRIEF DESCRIPTION OF THE DRAWINGS

FIG. 1 is a plan view of a woven carbon fiber cloth according to a first embodiment of the invention;

FIG. 2 is an exploded perspective view of a frame assembly according to a first embodiment of the invention;

FIG. 3 is a plan view of the carbon fiber cloth of FIG. 1 attached to the frame assembly of FIG. 2;

FIG. 4 is a sectional view taken along line 4–4 in FIG. 3;

FIG. 5 is an exploded perspective view of a second embodiment of the invention;

FIG. 6 is a view similar to FIG. 4 of the second embodiment of the invention;

FIG. 7 is a view similar to FIG. 6 of a third embodiment of the invention;

FIG. 8 is a view similar to FIG. 5 of a fourth embodiment of the invention;

FIG. 9 is a schematic transparent perspective view of an arrangement of planar anodes and cathodes according to the invention in a nitrate removal system; and FIG. 10 is a schematic transparent perspective view of a flow through nitrate removal system utilizing cylindrical electrodes according to the invention.

DETAILED DESCRIPTION OF THE PREFERRED EMBODIMENTS

Referring now to FIGS. 1 through 4, a first embodiment of a planar carbon fiber electrode 10 according to the invention, includes a woven carbon fiber cloth 12, an inert plastic rectangular frame 14, four titanium mounting strips 16, 18, 20, 22, and a plurality of titanium screws 24. The carbon fiber cloth 12 is woven from a plurality of PAN-derived carbon fibers having a yarn density of preferably 1 k to 18 k fibers per tow and a thread count of preferably 6 to 12.5 tow per inch. The inert plastic frame 14 is preferably made of TEFLON, PVC, DELRIN or a similar material and is advantageously provided with a plurality of mounting holes 15. Presently preferred embodiments of the frame 14 range in size from ten by eighteen inches to thirty by forty-eight inches. It will be appreciated, however, that the dimensions will vary according to the volume of the system in which the electrode is used. The four titanium strips 16, 18, 20, 22 are preferably provided with corresponding mounting holes 17, 19, 21, 23. According to the first embodiment, the carbon fiber cloth 12 is placed on top of the frame 14 and the titanium strips 16, 18, 20, 22 are placed on top of the carbon fiber cloth 12. The strips are aligned so that the holes 17, 19, 21, 23 in the strips overlie hole 15 in the frame and screws 24 are placed through the holes 17, 19, 21, 23 in the strips, through the carbon fiber cloth 12 and into holes 15 in the frame. If desired, the cloth can be stretched over the frame for a cleaner fit. The diameter of the holes 15 is preferably smaller than the diameter of the holes 17, 19, 21, 23 and the thread size of the screws 24 is preferably such that the threads pass freely through the holes 17, 19, 21, 23 and self-tap the holes 15. Alternatively, rivets may be used in lieu of screws. Also, screws with nuts could be used, in which case, both sets of holes would be through holes. According to a preferred embodiment, the titanium strips are dimensioned to overlap each other to make electrical contact with each other or, alternatively, the strips are electrically coupled to each other by titanium wires at the corners of the frame.

From the foregoing, those skilled in the art will appreciate that the titanium strips form a low impedance electrical contact with the carbon fiber cloth and enable the electrode to be coupled to a wire lead or electrical contact for use in an electrochemical circuit. The electrical contact with the titanium strips should be made with a titanium conductor to avoid any possibility of reaction between conductors of different type. Since titanium cannot be soldered, electrical contact may be made by wrapping a titanium conductor around one of the screws before tightening the screw, or by using biased titanium contacts against the titanium strips. According to a presently preferred embodiment, a one eighth inch diameter titanium rope is force fit into one of the holes between the frame and a titanium strip.

Turning now to FIGS. 5 and 6, a second embodiment of an electrode 110 according to the invention includes a braided noble metal oxide coated carbon fiber cloth 112, two metal frames 114, 116 and a plurality of screws (not shown). The frame 114 has a plurality of threaded holes 115 and the frame 116 has a plurality of preferably unthreaded holes 117. The electrode 110 is assembled by placing the carbon fiber cloth 112 on top of the frame 115, placing the frame 116 on top of the cloth 112 and fastening the frames together with screws (not shown) which pass through the holes 117 and thread into the holes 115.

Referring now to FIG. 7, a third embodiment of an electrode 210 according to the invention includes a carbon fiber cloth 212, two plastic frames 214, 214', four metallic strips (two of which 216, 220 are shown), and a plurality of screws (not shown). The metallic strips are similar to the titanium strips 16, 18, 20, 22 shown in FIG. 2 and the screws are similar to the screws 24 shown in FIG. 3. The frames 214, 214' are similar to the frame 14 shown in FIG. 2 except that frame 214' has holes with a larger diameter than the holes in frame 214. The electrode 210 is assembled by placing the carbon fiber cloth on top of frame 214, placing the four metallic strips including strips 216, 220 on top of the cloth 212 and aligning the holes in the strips with the holes in the frame 214, placing the frame 214' on top of the strips and aligning the holes in the frame 214' with the holes in the strips and the frame 214. Screws are then placed in the holes in the frame 214' and screwed into the holes in the frame 214 as described above. According to an alternative embodiment, fine foil strips are used in place of the titanium strips. Foil strips having cross sectional dimensions of from approximately 0.5 to approximately 1.0 inch wide and from approximately 0.001 to approximately 0.003 inch thick are suitable. In comparison, titanium strips having cross sectional dimensions of from approximately 0.5 to approximately 1.0 inch wide and from approximately 0.065 to approximately 0.5 inch thick are suitable. It will be appreciated that the dimensions of the strips will vary according to the dimensions of the frame.

From the foregoing, it will be appreciated that other fastening methods may be used to secure the cloth to the frame. For example, as suggested in the parent application, a tongue and groove fastening could be used with the cloth force fit between the tongue of a strip and the groove of a frame.

The electrodes thus described are ideally suited for use as cathodes in a nitrate removal system according to the parent applications. However, such electrodes may also be used as anodes in a nitrate removal system. In order to meet the surface area ratio requirements of the nitrate removal system, several layers of carbon fiber cloth are mounted in a single frame. Turning now to FIG. 8, a planar carbon fiber anodic electrode 310 according to the invention includes a plurality of braided or woven carbon fiber cloths 312*a*–312*g*, two plastic frames 314, 316 and a plurality of screws (not shown). The anodic electrode 310 is assembled in substantially the same way as the electrodes described above but with the many layers of cloth sandwiched between the frames.

According to a presently preferred method of use, the cathodic planar electrodes according to the invention are placed perpendicular to the water flow in a nitrate removal system so that substantially all of the water being treated must pass through the interstices of the woven or braided carbon fiber cloth. It will be appreciated, however, that the anodic electrodes cannot be placed in the same way since the many layers of cloth would be an impediment to the flow of water through the system. FIG. 9 shows an example of how anodes and cathodes according to the invention may be placed in a nitrate removal system to achieve optimal results.

Turning now to FIG. 9, a nitrate removal system 400 includes a flow cell 402 having an inlet 404 and an outlet 406. According to the invention, a plurality of planar carbon fiber cathodes, e.g. 110*a*–110*c*, are arranged in the flow cell 402 perpendicular to the flow path of the water to be treated and covering substantially all of the flow path so that substantially all of the water being treated must pass through the cathodes. A plurality of planar carbon fiber anodes, e.g. 310*a*–310*d*, are arranged in the flow cell 402 perpendicular to the flow path of the water to be treated but covering substantially less than all of the flow path so that the relatively dense multiple layers of the anodes do not significantly impede the flow of water through the system.

From the foregoing, and in view of the disclosures of the parent applications, those skilled in the art will appreciate that the nitrate removal system 400 will also include an electrical circuit connected to the anodes and cathodes as well as some means, such as a pump, for moving water through the flow cell. According to a presently preferred embodiment, a separate electrical circuit is provided for each pair of electrodes. In addition, it will be appreciated that since the actual nitrate removal reactions take place at the cathodes, the anodes may be arranged in any convenient manner which does not interfere with water flow. It will also be understood that, for the same reason, it is advantageous to arrange the cathodes as shown in FIG. 9 so that substantially all of the water flowing through the flow cell comes in contact with the cathodes for reaction.

As suggested in the parent application, the electrodes according to the invention need not be flat planar electrodes. For example, cylindrical planar electrodes may be advantageously utilized in a flow-through system. Turning now to FIG. 10, a nitrate removal system 500 includes a generally cylindrical flow cell 502 having an inlet 504 and an outlet 506. As shown in FIG. 10, the inlet 504 is substantially coaxial with the axis of the cylindrical cell 502 and the outlet 506 is substantially radial relative to the cylindrical cell 502. According to the invention, one or more cylindrical carbon fiber cathodes, e.g. 510, are coaxially arranged in the flow cell 502. One or more cylindrical carbon fiber anodes, e.g. 610, are arranged in the flow cell 502 coaxial with the cathodes. In order to assure that substantially all of the water flowing through the cell is processed, the inlet 504 and the outlet 506 are arranged as shown such that water enters axially into the inner cylindrical electrode and exits radially through all the electrodes. It will be appreciated, however, that the location of the inlet and the outlet can be reversed so long as the inlet and outlet are substantially orthogonal to each other.

From all of the foregoing, it will be appreciated that the cylindrical electrodes may be assembled in much the same manner as the flat planar electrodes. For example, cylindrical plastic frames (preferably perforate) may be used with one or more linear titanium strips, or with two circular titanium strips.

There have been described and illustrated herein several embodiments of planar carbon fiber and noble metal oxide electrodes as well as methods of making and using them. While particular embodiments of the invention have been described, it is not intended that the invention be limited thereto, as it is intended that the invention be as broad in scope as the art will allow and that the specification be read likewise. Thus, while particular dimensions have been disclosed, it will be appreciated that other dimensions could be utilized. Also, while particular frames and strips have been shown, it will be recognized that other types of frames and strips could be used with similar results obtained. Moreover, while particular configurations have been disclosed in reference to the number of mounting screws, it will be appreciated that other configurations could be used as well. Furthermore, while the electrodes have been disclosed as in the context of certain types of flow cells, it will be understood that the electrodes according to the invention may be used in many different kinds of electrochemical reaction cells, either in a batch processing system or in a flow through system.

It will therefore be appreciated by those skilled in the art that yet other modifications could be made to the provided invention without deviating from its spirit and scope as so claimed.

We claim:

1. A carbon fiber electrode, comprising:

a) a carbon fiber cloth b) a first frame; and c) fastening means for fastening said carbon fiber cloth to said first frame, said carbon fiber cloth being affixed to said first frame by said fastening means, wherein said fastening means is constructed and arranged to be in contact with a wire lead or electrical contact such that the fastening means forms a low impedance electrical contact with said carbon fiber cloth.

2. An electrode according to claim 1, wherein:

said first frame is made of plastic and said fastening means includes a plurality of metallic strips, said carbon fiber cloth being arranged between said first frame and said strips.

3. An electrode according to claim 2, wherein:

said metallic strips each have a plurality of mounting holes and said fastening means further includes a plurality of screws, said strips being attached to said first frame by said screws through said holes.

4. An electrode according to claim 1, wherein:

said fastening means includes a second frame, said carbon fiber cloth being arranged between said first frame and said second frame.

5. An electrode according to claim 4, wherein:

at least one of said first and second frames is metallic.

6. An electrode according to claim 4, wherein:

said first and second frames are made of plastic and said fastening means includes a plurality of metallic strips, said carbon fiber cloth being arranged between said first frame and said strips.

7. An electrode according to claim 1, wherein:

said carbon fiber cloth is coated with a noble metal oxide.

8. An electrode according to claim 1, wherein:

said first frame is substantially rectangular.

9. An electrode according to claim 1, wherein:

said first frame is substantially cylindrical.

10. An electrode according to claim 1, further comprising:

d) a plurality of additional carbon fiber cloths, said additional carbon fiber cloths being affixed to said first frame by said fastening means.

11. An apparatus for reducing nitrates in an aqueous solution, comprising:

a) a flow cell having an inlet and an outlet defining a flow path; and b) a carbon fiber electrode, comprising:
 i) a carbon fiber cloth
 ii) a first frame; and
 iii) fastening means for fastening said carbon fiber cloth to said first frame, said carbon fiber cloth being affixed to said first frame by said fastening means, wherein said fastening means is constructed and arranged to be in contact with a wire lead or electrical contact such that the fastening means forms a low impedance electrical contact with said carbon fiber cloth.

12. An apparatus according to claim 11, wherein:

said frame is substantially rectangular, and said carbon fiber electrode is arranged in said flow cell substantially perpendicular to said flow path.

13. An apparatus according to claim 11, wherein:

said frame is substantially cylindrical, and said carbon fiber electrode is arranged in said flow cell substantially parallel to said flow path.

14. An apparatus according to claim 11, wherein:

said carbon fiber electrode further includes
 iv) a plurality of additional carbon fiber cloths, said additional carbon fiber cloths being affixed to said first frame by said fastening means.

15. An apparatus according to claim 11, wherein:

said carbon fiber cloth is coated with a noble metal oxide.

16. An apparatus according to claim 11, wherein:

said first frame is made of plastic and said fastening means includes a plurality of metallic strips, said carbon fiber cloth being arranged between said first frame and said strips.

17. An apparatus according to claim 11, wherein:

said fastening means includes a second frame, said carbon fiber cloth being arranged between said first frame and said second frame.

18. An apparatus according to claim 17, wherein:

said first and second frames are made of plastic and said fastening means includes a plurality of metallic strips, said carbon fiber cloth being arranged between said first frame and said strips.

* * * * *